April 14, 1953
J. KAHL ET AL
2,634,606
TWIN FLOAT HYDROMETER SYRINGE FOR FUEL OILS
Filed Feb. 21, 1951
2 SHEETS—SHEET 1
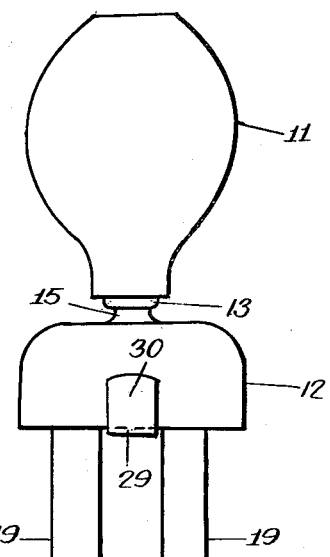
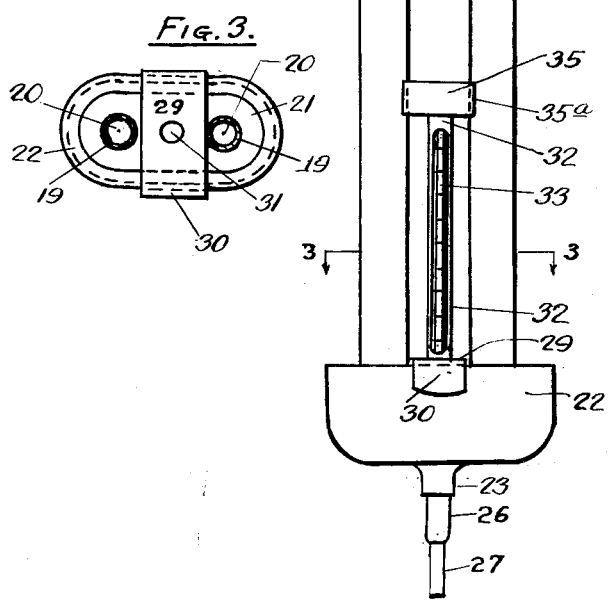
INVENTORS;
Joseph Kahl,
Oliver N. Johnsrud,
BY Israel Benjamins,
Attorney.

April 14, 1953   J. KAHL ET AL   2,634,606
TWIN FLOAT HYDROMETER SYRINGE FOR FUEL OILS
Filed Feb. 21, 1951   2 SHEETS—SHEET 2
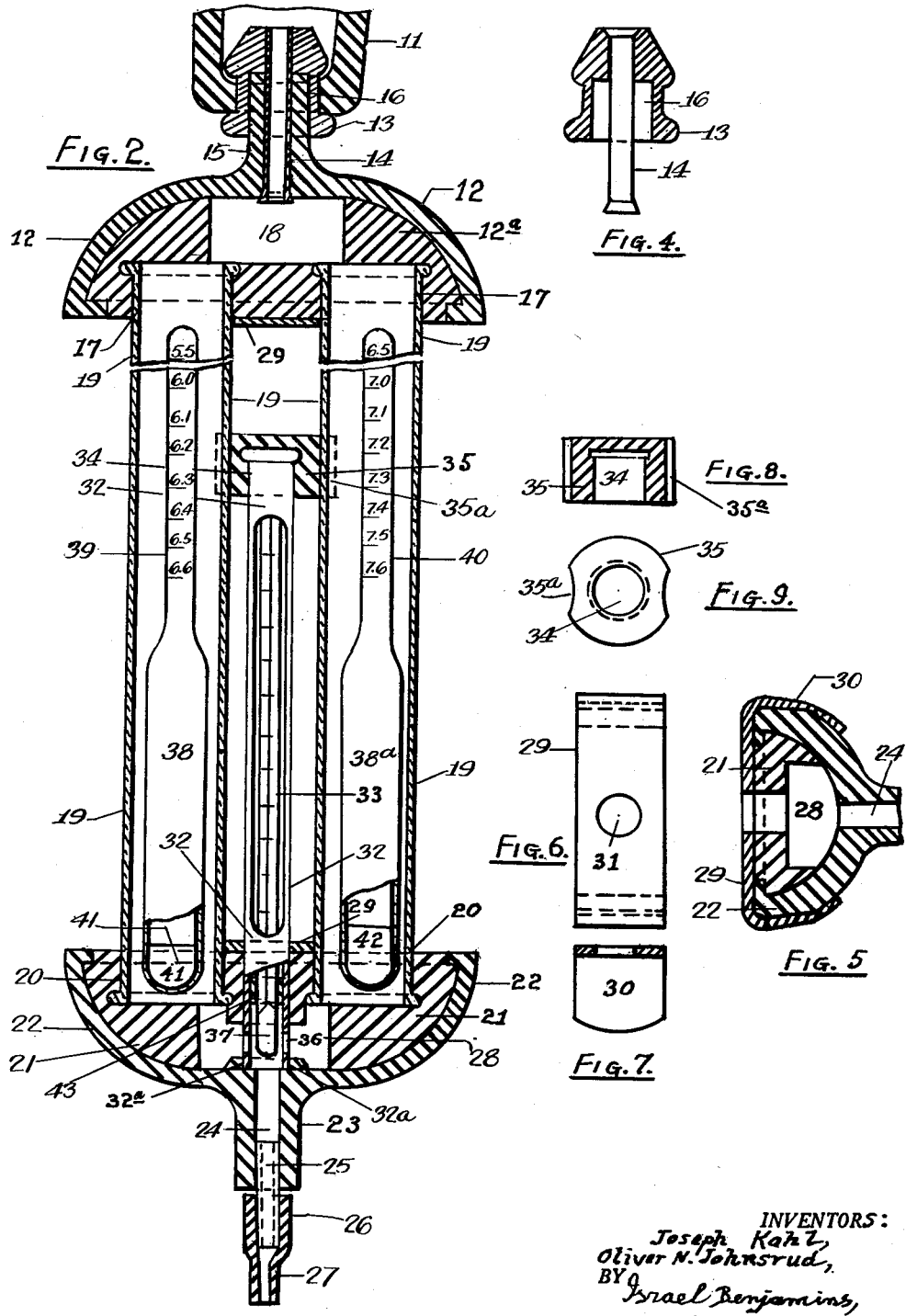
INVENTORS:
Joseph Kahl,
Oliver N. Johnsrud,
BY
Israel Benjamins,
Attorney Patented Apr. 14, 1953

2,634,606

UNITED STATES PATENT OFFICE 2,634,606

TWIN FLOAT HYDROMETER SYRINGE FOR FUEL OILS

Joseph Kahl and Oliver N. Johnsrud, New York, N. Y.; said Johnsrud assignor to G M Manufacturing Co., New York, N. Y.

Application February 21, 1951, Serial No. 212,026

1 Claim. (Cl. 73—34)

This invention relates to improvements in twin float hydrometer syringes for indicating the densities of liquids and specifically the densities of fuel oils.

Heretofore hydrometer syringes were used with single floats therein and the observer had not only to test one liquid at a time with a given instrument, but he had to find out first which instrument will suit the particular liquid densities.

As an object of our improvement we propose to use one instrument comprising two hydrometer floats with different scales to test the densities of different liquids, whereby by using a single instrument one may determine accurately the densities of liquids over a wide range thereof.

Another object is to save the technician's time by enabling him to draw liquid into two different test cylinders in one operation, instead of making repeated trial tests.

A further object is to save transportation costs of multiple instruments, storage space, capital investment, etc.

A still further object is to enable the technician to obtain a more sensitive and accurate reading with an instrument of the same length by the use of two hydrometer floats, each of which is calibrated for a different specific density, instead of using a single float hydrometer having the entire range of specific density reading on a single scale.

Another object is to have our twin float hydrometer syringe relatively simple, durable and inexpensive.

A still further object is to have the instrument so designed that replacement parts may be easily fitted thereto without the need of skilled labor or special tools, and to be simple to assemble or disassemble.

Other objects and advantages will hereinafter appear.

Another object is to facilitate cleaning of the headers and tubes, which are hereinafter described, should they become clogged.

We attain these objects by the twin float hydrometer syringe illustrated on the accompanying drawings or by any mechanical equivalent or obvious modifications of the same.

In the drawings,

Fig. 1 is a side elevation in a plane parallel to the paper of our twin float hydrometer syringe drawn to a reduced scale and omitting the connection to a liquid which is to be tested.

Fig. 2 is a fragmentary vertical central section of our twin float hydrometer syringe in a plane passing through both floats, drawn to a larger scale than Fig. 1 and showing some details in elevation.

Fig. 3 is a section on the line 3—3 of Fig. 1 drawn to the same scale as Fig. 1 and showing the lower header of our twin float hydrometer syringe which is hereinafter described.

Fig. 4 is a vertical central section of the connection of the upper header to the syringe bulb and showing tube 14, which is hereinafter described, in elevation.

Fig. 5 is a transverse central section of the said lower header, which is hereinafter described.

Fig. 6 is a plan view of the clamp which holds together the two rubber sections of the lower header, which is hereinafter described, and Fig. 7 is a transverse central vertical section of the same. A similar clamp is used to hold the sections of the upper header together.

Fig. 8 is a vertical section of the rubber plug which supports the upper end of the thermometer and thermometer casing, which is hereinafter described, and Fig. 9 is a bottom plan view of the said plug.

Similar numerals refer to similar parts throughout the several views of the drawings; 11 designates the resilient rubber air bulb which is shown in section in Fig. 2 and as connected to the upper header 12 of the syringe by means of a plug 13 and a tube 14 which passes therethrough and extends into the interior of the header.

The bulb 11 is preferably made of soft rubber and the header 12 of medium soft rubber; the plug 13 and the tube 14 may be made of metal or plastic.

The header 12 is shown as having at the upper end thereof a neck 15 which extends into an opening 16 in the plug 13.

The header 12 encloses a filler block 12a, which has therein at the upper side thereof a hollow space 18 and at the lower side thereof two openings 17 for receiving the upper ends of the two vertical transparent tubes 19.

The lower ends of the tubes 19 extend into the openings 20 in a filler block 21 of a lower header 22 which terminates at its lower end in a neck 23 which has therein an opening 24 to receive therein one end of a nipple 25, the other end of which extends into one end 26, of a flexible tube 27, the greater part of which is broken away in the drawings.

The filler block 21 has therein a cavity 28 which communicates with the opening 24 and with the interior of each of the tubes 19 at the lower end of the latter; the upper ends of the tubes 19 communicate with the space 18 in the filler block 12a, and the space 18 communicates with the tube 14 and through the tube 14 with the interior of the bulb 11.

The filler block 21 and the header 22 are kept together by a resilient metal strip 29 which has thereon arms 30 to embrace the sides of the header 22; the strip 29 extends transversely to the filler block 21 and header 22, and it has therein an opening 31 for passing therethrough the lower end of a thermometer casing 32, which encloses a thermometer 33; the upper end of the casing 32 extends into an opening 34 of a rubber block 35 which is placed between the tubes 19, is notched on to them at 35a, and is retained in position by its resilience.

The part of the lower end of the casing 32 extends into the said cavity 28 and it has therein openings 36 wherethrough to communicate with said cavity 28. The lower end of the thermometer casing 32 extends into a depression 32a at the bottom of the header 22 for keeping thermometer 33 parallel to the tubes 19 and with the liquid flowing therethrough.

The bulb 37 of the thermometer 33 is positioned opposite the openings 36 in the casing 32. To prevent liquid from leaking out or escaping through the casing 32, we provide an annular packing ring or sleeve 43 in the annular space between the thermometer 33 and the casing 32.

The tubes 19 enclose two hydrometer floats 38 and 38a with different ranges of density marked on their stems 39 and 40 respectively.

Near their lower ends the floats 38 and 38a are weighted or loaded with suitable weights or ballast, 41 and 42. Float 38 is shown as less heavily loaded than float 38a.

The operation of our twin float hydrometer syringe is as follows:

By manually compressing the soft rubber bulb 11 at the upper end of the device the liquid, if any, contained therein may be expelled from the tubes 19; by gradually releasing the pressure on the bulb 11 the liquid, which is to be tested, is drawn in through the tube 27 from a suitable receptacle in which the liquid is contained.

The density of the liquid may then be observed on one of the scales of the two floats, each of which contains therein a one of two graduated scales of different densities. The reading is taken at the surface of the column of liquid contained in one of the tubes 19. The liquid on the other stem being either two high or too low for the range of densities marked on the scales enclosed in the stem.

For fuel oils which are to be tested by this syringe, all available ranges of densities are marked on the scales contained in either one or the other of the stems of the two floats.

The hereinbefore described parts of soft rubber are designed to prevent leakage of air or of liquid.

It is evident that in the above described hydrometer syringe the parts of the same may be readily disconnected and wiped or washed when necessary.

Many other changes may be made in the details of our twin float hydrometer syringe without departing from the main scope of our invention.

We do not, therefore, restrict ourselves to the details as shown in the drawings. We claim as our invention and desire to secure by Letters Patent:

A twin float hydrometer syringe comprising an upper header in communication with an air pumping means and a lower header in communication with a supply of liquid to be tested, a filler block detachably and removably disposed in each of said headers, said filler blocks being connected to the ends of a pair of transparent tubes in communication therewith and with said headers, a pair of unequally loaded floats enclosed by said tubes, said floats having thereon stems with suitable indicia thereon extending into the liquid inspirated into the said tubes, whereby to have the density of said liquid indicated by the indicia on one of said stems, and said filler blocks being arranged to be readily removed from said headers for cleaning the same.

JOSEPH KAHL.
OLIVER N. JOHNSRUD.

References Cited in the file of this patent
UNITED STATES PATENTS

| Number | Name | Date |
|---|---|---|
| 1,767,439 | Edelmann | June 24, 1930 |
| 2,018,441 | Edelmann | Oct. 22, 1935 |